April 28, 1964     R. J. COFFEY     3,131,282
WELDING MEANS

Filed May 16, 1961     2 Sheets-Sheet 1

INVENTOR.
Ralph J. Coffey
BY
ATTORNEYS

April 28, 1964  R. J. COFFEY  3,131,282
WELDING MEANS
Filed May 16, 1961  2 Sheets-Sheet 2
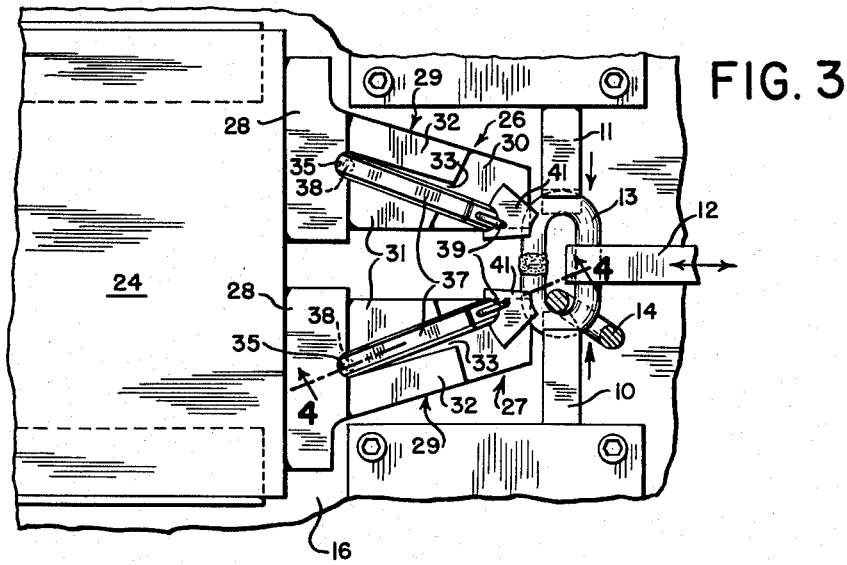
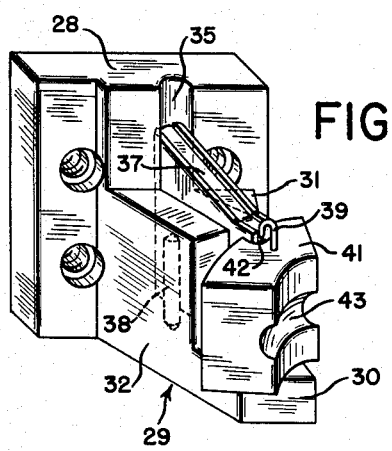
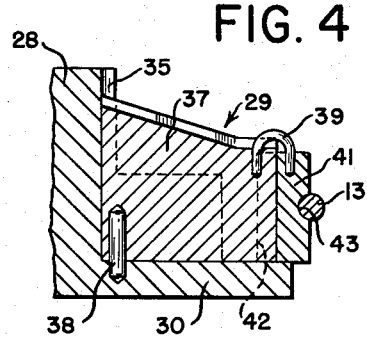
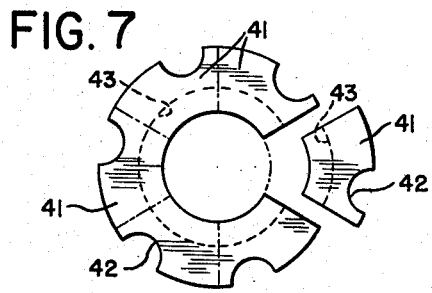
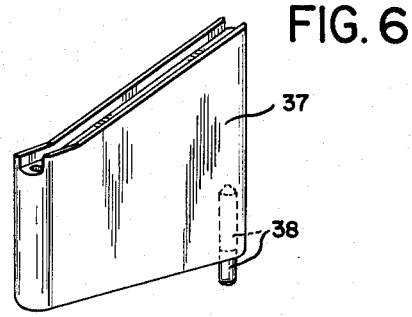
INVENTOR.
Ralph J. Coffey
BY
ATTORNEYS United States Patent Office 3,131,282
Patented Apr. 28, 1964

3,131,282
WELDING MEANS
Ralph J. Coffey, York, Pa., assignor to American Chain & Cable Company, Inc., a corporation of New York
Filed May 16, 1961, Ser. No. 110,420
4 Claims. (Cl. 219—51)

This invention relates to welding means for use particularly in chain-baking apparatus. The new welding means is characterized in that it includes electrodes and a transformer both mounted directly on a carriage and movable together into and out of welding position relative to a work piece.

In most welding operations, the electrodes are movable with respect to the work piece, as for example in chain-making apparatus where the welding electrodes are moved into and out of welding contact with the ends of a lug which are closed about the endmost link of previously formed chain. In the circuitry of such welding apparatus, a transformer is usually provided adjacent thereto to raise line current to a sufficient level and flexible copper leads are employed to connect the high-current terminals of the transformer with the electrodes. In order to permit sufficient freedom of movement of the electrodes relative to the transformer, these copper leads have been designed in the form of elongated U-shaped straps connected at their ends to the respective terminals and electrodes. Because straps of this type must be quite long to give enough freedom of movement to the electrodes, they present a relatively high resistance to current flow. A correspondingly higher capacity transformer is therefore required and the straps must be made quite heavy, thereby adding significantly to the cost of the apparatus.

It is the general object of the present invention to provide a new arrangement of a transformer and movable electrodes which require shorter and lighter copper leads interconnecting the transformer terminals with the electrodes and which permit the use of an appreciably lighter and lower capacity transformer for a given welding operation.

According to the invention, the new welding apparatus comprises a frame and a carriage slidably mounted on the frame. A transformer is mounted on the carriage and includes high and low current terminals. Flexible leads are electrically connected to the low current terminals of the transformer for conducting current thereto. Welding electrodes are mounted on the transformer and are electrically connected to the high current terminals thereof. Also, means are provided for displacing the carriage to move the electrodes into and out of welding contact with a work piece.

By mounting the transformer directly on the carriage, it is no longer necessary to provide heavy flexible leads between the high current terminals of the transformer and the electrodes. The only flexible leads required are those connecting the low current terminals of the transformer with a power source and these need not be especially large since their current capacity is low. Not only does this novel arrangement effect a considerable saving in the amount of copper required to connect the electrodes with the transformer, but it also results in a considerable reduction in the size and capacity of the transformer for a given welding operation.

The invention also provides this new development in combination with chain-making apparatus. In that instance, novel pivotal mounting means for each electrode are also provided so that better welding engagement can be achieved with the ends of lugs which are successively closed into the links of chain. This pivotal mounting for each electrode comprises a bracket pivotally attached to the transformer. Suitable means are included for limiting the pivotal movement of the bracket. Also, hinge means are provided for pivotally supporting the electrode on the end of the bracket remote from the transformer. These pivotal mounting means may serve as the conductors for carrying current from the high-current terminals of the transformer to the electrodes.

A preferred embodiment of the new welding means is described below with reference to the accompanying drawings, wherein FIG. 1 is a fragmentary plan view of the new slidably mounted transformer and electrodes adjacent the link-forming apparatus of a chain-making machine;

FIG. 3 is an enlarged fragmentary plan view showing the electrodes in welding contact with the lug;

FIG. 4 is an enlarged fragmentary section taken along the line 4—4 of FIG. 3;

FIG. 5 is a perspective view of one electrode and its pivotal mounting means;

FIG. 6 is a perspective view of the bracket which supports the electrode; and

FIG. 7 is a plan view of pre-shaped stock material which may advantageously be used for forming the electrodes.

Figure 1:
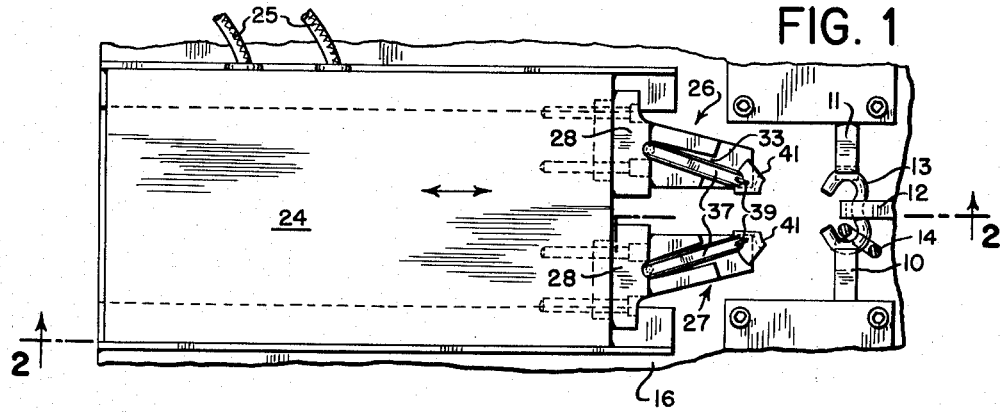
Figure 1:
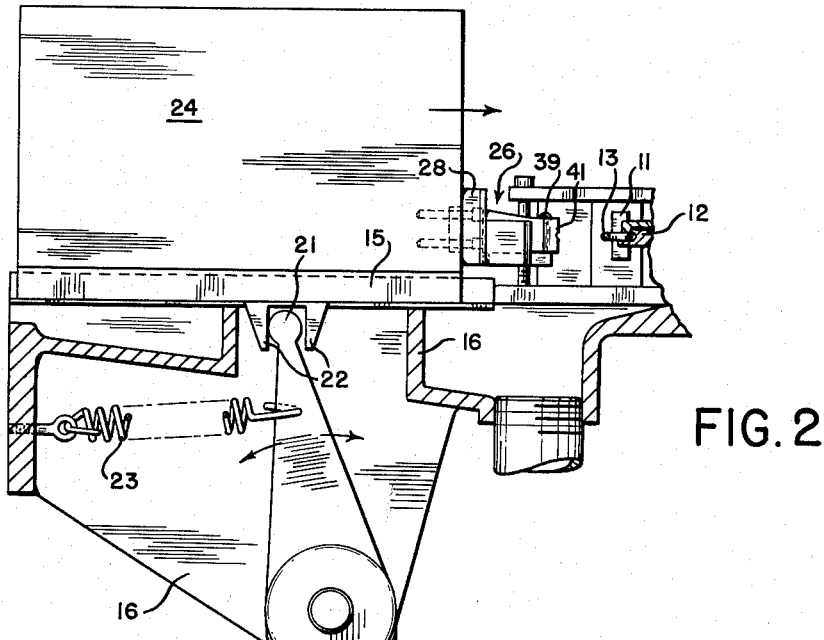
Figure 2:
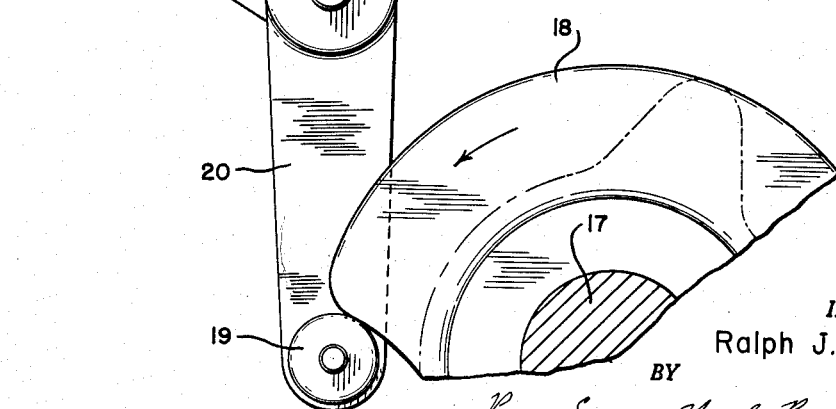
FIG. 2 is a fragmentary section taken along the line 2—2 of FIG. 1 showing the carriage displacing means.

The portion of the chain-making machine shown in FIGS. 1 and 2 includes closing dies 10 and 11 and a lug-holding clamp 12. In any suitable manner, a substantially C-shaped lug 13 is gripped in the clamp 12 and moved into position between the dies 10 and 11 as shown in FIG. 1. Then, one or both of the dies 10 and 11 moves toward the other to engage the opposite rounded end portions of the lug 13 and force them closed about an endmost link 14 of previously formed chain. After being closed in this manner, the lug 13 is substantially in the position shown in FIG. 3, and it is necessary to weld the adjoining ends of the closed lug to form it into a finished link. Thereafter, the dies 10 and 11 may be withdrawn and the clamp 12 released so that the newly formed link falls free as the endmost one on the chain. The present invention provides apparatus for carrying out this welding operation.

The new welding apparatus includes a carriage 15 supported on a frame 16 which is part of the overall structure of the chain-making machine. The carriage 15 is mounted in ways to be slidably displaced toward and away from the dies 10 and 11 where the welding is to take place. To move the carriage in this manner, a shaft 17 is rotatably mounted in the frame. It supports a cam 18 engaged by a follower 19 on a bell-crank 20 which is pivoted to the frame. (Other cams may also be mounted on the shaft 17 to actuate the dies 10 and 11, the clamp 12, and other movable elements of the chain-making machine.) At the end of the bell-crank 20 opposite the follower 19 is a pusher element 21 which pivotally engages the carriage within socket members 22 depending therefrom.

A tension spring 23 anchored to the frame 16 urges this end of the bell-crank 20 in a counter-clockwise direction as shown in FIG. 2 to hold the follower 19 in engagement with the cam 18.

Supported directly on the upper surface of the carriage 15 is a transformer 24 which, by conventional standards, is of relatively small size and low-capacity for a welding operation of the type described. Flexible insulated conductors 25 are connected to the low-current terminals of the transformer 24 to carry current thereto from any suitable power source. A pair of electrode assemblies 26 and 27 extend from the transformer 24 at the end thereof adjacent the dies 10 and 11. As shown in FIGS. 3 through 6, each of these assemblies includes a base element 28 of copper or other conductive material which is electrically connected to one of the high-current terminals of the transformer 24. A bracket support 29 of similar conductive material projects from the base element 28 and includes a shelf portion 30. A pair of bracket stops 31 and 32 extend integrally from the upper side of the shelf portion 30 and define between them a tapered slot 33. At the end of the slot 33 nearest the transformer is a vertical semi-cylindrical groove 35 formed in the base portion 28.

As shown in detail in FIG. 6, an electrode-supporting bracket 37 is adapted to fit within the slot 33. One end of the bracket 37 is rounded to seat in the semi-cylindrical groove 35. A pivot pin, extending upwardly through the shelf portion 30, fits within a bore in the bracket 37 adjacent the rounded end thereof. By this construction, the bracket 37 is adapted to be fitted easily into the slot 33 and over the pin 38 so that it is pivotally held by the pin to swing freely in the slot between the stop portions 31 and 32.

On the end of the bracket 37 remote from its pivotal mounting is an electrically conductive U-shaped clip 39. The clip 39 is adapted to be pivotally attached at its opposite ends to both the bracket 37 and a carbon electrode 41 which is shown most clearly in FIG. 5. The bottom of the electrode 41 is supported by the outer end of the shelf portion 30. In this manner, the electrode is given limited freedom of movement about the end of the bracket 37 which fits in the slot 35 and also about the outer end of the bracket to which the electrode is attached by the clip 39.

The form of the electrode 41 is shown most clearly in FIGS. 5 and 7. Advantageously, it may be shaped from a wedge section of a flat carbon ring, as shown in FIG. 7. A longitudinal groove 42 is formed on its backside to receive the rounded outer end of the bracket 37. Also, a semi-circular circumferential groove 43 is formed on its front side to receive the work piece.

In the operation of the new welding apparatus as employed in a chain-making machine, an open C-shaped lug 13 is moved by the clamp 12 between the closing dies 10 and 11. At this point, the carriage 15 supporting the transformer 24 is in retracted position. The closing dies 10 and 11 are moved together such that the ends of the lugs 13 are closed about the endmost link 14 of previously formed chain. These various operations may be effected by other cams (not shown) mounted on the shaft 17.

Next, the cam 18 on shaft 17 displaces the follower 19 on the bell-crank 20 and causes the bell-crank 20 to move in a clockwise direction as shown in FIG. 2. This causes the pusher element 21 fitted between the socket members 22 to urge the carriage 15 to the right as shown in FIG. 2 toward the closed lug 13. Consequently, the electrodes on the assemblies 26 and 27 come into engagement with the adjoining end portions of the lug 13 as shown in FIG. 3. When the electrodes contact the work piece, the circumferential grooves 43 therein seat in optimum surface-to-surface contact with the lug end portions since the pivotal connections at both ends of the brackets 37 permit the electrodes to settle firmly in place. Current then passes from the high-current terminals of the transformer 24 through the electrically conductive assemblies 26 and 27 and the electrodes attached thereto so that the interface between the adjoining lug end portions is securely welded.

In moving into welding position, the transformer 24 is carried by the carriage 15. Therefore, only the conductors 25 leading from the power source to the low-current terminals of the transformer need be flexible to permit this freedom of movement. Since the path through the assemblies 26 and 27 from the high-current terminals of the transformer to the electrodes is quite short, it presents very little resistance to the current. Thus, the weight of the brackets and other parts of the electrode supporting assemblies can be minimized and the transformer itself can be of relatively low capacity.

I claim:
1. Welding apparatus comprising a frame, a carriage movably mounted on the frame, a transformer mounted on the carriage and having high and low current terminals, flexible leads electrically connected to the low current terminals of said transformer for conducting current thereto, welding electrodes mounted on the transformer and electrically connected to the high current terminals thereof, means for displacing the carriage to move the electrodes into and out of welding contact with a work piece, and pivotal mounting means supporting said electrodes on said transformer to permit limited relative movement therebetween and facilitate welding contact with said work piece.

2. In chain-making apparatus wherein the ends of a lug are closed about the endmost link of previously formed chain, welding apparatus for cojoining the closed ends of the lug comprising a frame, a carriage slidably mounted on said frame, a transformer mounted on said carriage and having high and low current terminals, flexible leads electrically conencted to the low current terminals of said transformer for conducting current thereto, a pair of welding electrodes mounted on said transformer and electrically connected to the high-current terminals thereof, means for displacing said carriage to move said electrodes into and out of welding contact with the closed ends of said lug, and pivotal mounting means supporting said electrodes on said transformer to permit limited relative movement therebtween and facilitate welding contact with said lug.

3. Chain-making apparatus according to claim 2 wherein said pivotal mounting means are electrically conductive and electrically connect the respective high-current terminals and electrodes, and wherein each mounting means comprises a bracket pivotally attached to said transformer, stop means for limiting pivotal movement of said bracket, and means for pivotally supporting the electrode on the end of said bracket remote from said transformer.

4. In chain-making apparatus wherein the ends of a lug are closed about the endmost link of previously formed chain by dies actuated by a cam shaft mounted in a frame, welding apparatus for cojoining the closed ends of the lug comprising a carriage mounted on said frame for slideable movement toward and away from said dies, a transformer mounted on said carriage and having high and low current terminals, flexible leads electrically connected to the low current terminals of said transformer for conducting current thereto, a pair of welding electrodes mounted on said transformer and electrically connected to the high current terminals thereof, cam and linkage means actuated by said cam shaft for displacing said carriage to move said electrodes into and out of welding contact with the closed ends of said lug, and electrically conductive pivotal mounting means electrically connecting the high-current terminals with the respective electrodes and supporting said electrodes to permit limited relative movement thereof to facilitate welding contact with said lug, said mounting means for each electrode comprising a bracket pivotally attached to said transformer, stop means for limiting pivotal movement of said bracket, and hinge means for pivotally supporting the electrode on the end of said bracket remote from said transformer.

References Cited in the file of this patent
UNITED STATES PATENTS

| | | |
|---|---|---|
| 1,041,778 | Gravell | Oct. 22, 1912 |
| 2,154,654 | Armentrout et al. | Apr. 18, 1939 |
| 2,161,430 | Potchen | June 6, 1939 |
| 2,239,114 | Olmstead | Apr. 22, 1941 |
| 2,269,091 | Humphrey | Jan. 6, 1942 |
| 2,556,602 | Schwartz | June 12, 1951 |